Patented Aug. 10, 1926.

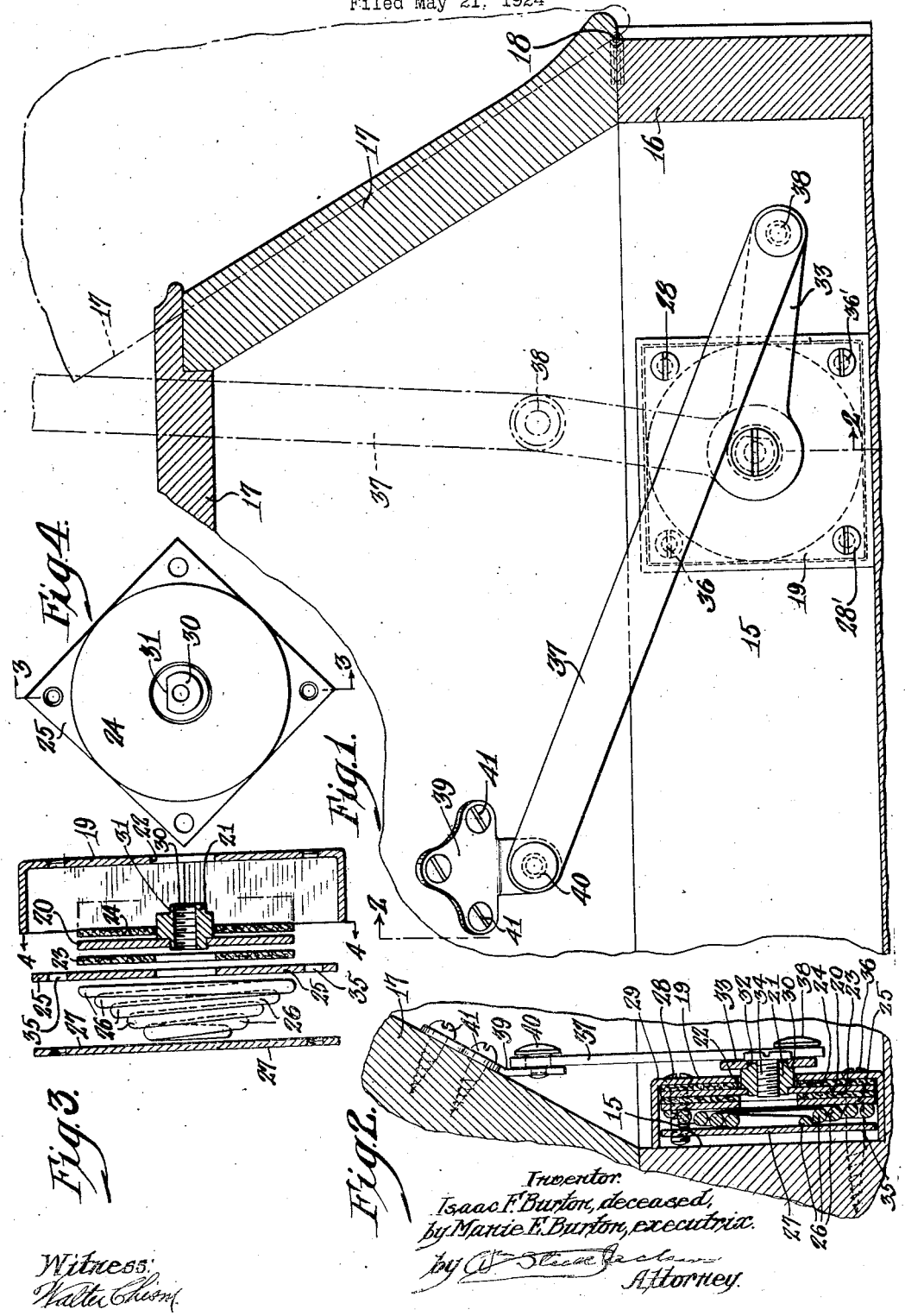

1,595,500

UNITED STATES PATENT OFFICE.

ISAAC F. BURTON, DECEASED, LATE OF PHILADELPHIA, PENNSYLVANIA; BY MANIE E. BURTON, EXECUTRIX, OF PHILADELPHIA, PENNSYLVANIA, ASSIGNOR TO VISUALATONE COMPANY OF AMERICA, OF PHILADELPHIA, PENNSYLVANIA, A CORPORATION OF DELAWARE.

PHONOGRAPH-LID SUPPORT.

Application filed May 21, 1924. Serial No. 714,798.

This invention relates to lids and friction support therefor, more particularly as applied to phonograph cabinet lids to prevent inadvertent slamming or, if desired to maintain the lid partially open wherever it may be set.

The principal purpose of this invention is to provide resilient pressure, uniform when set and independently of their wear between non-metallic friction surfaces bearing upon a lid-supporting arm.

A further purpose is to have the lid operate a friction disc between felt washers one of which is resiliently pressed toward the other.

A further purpose is to support the resilient means, preferably a conical helical spring, upon a base longitudinally adjustable along the axis of the spring, to provide adjustment of the pressure.

A further purpose is to support the friction mechanism and adjustment from the end of a box encasing the mechanism.

A further purpose is to place the base of the cone against the follower plate rather than against the base plate in order that any yield of the follower plate incident to pressure by the spring will be near the outer circumference of the felt washers where friction will be most effective.

Further purposes are to mount the friction mechanism in a square box loosely casing the friction disc, felt washers, follower plate and spring base plate, to make the disc and washers circular to be rotatable, to make the follower plate and base plate square to be non-rotatable, to adjustably support the base from the bottom of the box at diagonally opposite corners outside of the disc by means of screws, and to clamp the box to place bottom outward against the wall of the cabinet by means of screws in the other diagonally opposite corners of the box.

Further purposes will appear in the specification and in the claims.

It is preferred to illustrate this invention by one only of its various forms, which form however that has been found to be efficient and reliable and which well illustrates the principles involved.

Figure 1 is a broken sectional elevation showing this invention mounted within a phonograph cabinet.

Figure 2 is a broken section of Figure 1 taken upon the line 2—2.

Figure 3 is a diagonal section of the box and clutch mechanism with the parts disconnected upon line 3—3 of Figure 4.

Figure 4 is a sectional view of Figure 3 taken upon the line 4—4.

In the drawings similar numerals indicate like parts.

Describing in illustration and not in limitation and referring to the drawings:—

The function of this invention may be either that of maintaining the lid of a phonograph cabinet at any position to which it has been set, or that of so dampening the freedom of closure of a lid as will prevent it from accidentally slamming shut.

In the drawings the invention is shown mounted in operating position upon the inner surface 15 of a cabinet 16 having lid 17 hinged to the cabinet at 18.

The friction unit includes the supporting and encasing square box member 19 and the round friction disc 20 within the box rigidly fastened to a hub 21 extending through a suitable hole and hub bearing 22 in the bottom of the box. Washers 23 and 24 are located upon opposite sides of the disc and are relatively pressed toward each other and against the disc by a follower plate 25, and spiral spring 26. The spring presses against the follower at one side and, at the other, against a base 27. Screws 28 and 28' tie the base plate 27 to the bottom 29 of the box and provide for adjustment of their spacing and, therefore, for adjustment of the spring pressure.

The hub 21 of the friction disc need not be integral with the disc and may conveniently be made as shown in the drawings, as a separate sleeve staked or otherwise fastened to the sleeve. The outer end 30 of the hub, outside of the box, is provided with a non-circular shoulder 31 (Figure 4) to fit the corresponding hole 32 in a crank member 33.

The hub is internally threaded for screw 34, and this screw rigidly holds the crank member to the hub, making the disc, hub, screw and crank member a rigid unit.

The washers 23 and 24 are formed of suitable material such as felt or leather, usually felt, and hence are called "felts". They combine to form a silent friction brake.

The follower plate is non-rotatable and therefore is conveniently made square to loosely fit the interior of the box. Corner holes 35 are provided to pass the corner screws freely.

The spring base 27 also should not be tight against the interior walls of the box. The corner screws 28 and 28' are diagonally opposite one another to support the base plate upon opposite sides, and give a substantially balanced support to the plate. These screws pass freely through the bottom of the box at 35 and thread through the plate, whereby the plate may be adjusted to any desired distance from the bottom of the box and corresponding compression upon the spring.

The spring 26 lies between the base plate and follower plate. Its spiral is made conical to enable successive turns to compress into one another without striking. Preferably the spiral flares toward the follower plate so as to press against this plate near the outer circumference of the felts, with the result that any slight yield or strain of the follower plate by reason of the pressure of the spring will be transmitted to the adjacent felt near its outer circumference rather than near its center.

In this friction unit the disc is resiliently clamped between the felts and they bear against the bottom of the box and follower plate respectively. The pressure is applied through the follower plate by the compression spring and its compression is adjusted by the corner screws 28 and 28' to give any desired braking of the disc.

The friction unit is mounted bottom out against an inner wall 15 of the cabinet by means of the corner wood screws 36 and 36'. The clamping action of these screws is balanced by locating them at diagonally opposite corners of the box. One pair of diagonally opposite corners provides space for the screws 28 and 28' supporting the spring base from the bottom of the box, and the other pair of diagonally opposite corners provides space for the screws 36 and 36' which alternate between screws 28 and 28' and clamp the friction unit to place against the wall of the cabinet.

The connecting link 37 is pivotally connected to the outer end of the crank at 38 and at the other end is pivotally connected to the bracket 39 at 40. The bracket 40 is fastened to the lid by screws 41.

The disc and pivots of the connecting link should be arranged to turn in a plane or planes parallel to the hinging of the lid.

The lid and disc are thus linked to operate together, so that any closure of the lid is frictionally and silently resisted to any desired extent at the disc.

In operation:—Normally the spring compression will be adjusted until the friction support will hold the lid at full open yet permit it to quietly close if the lid is given a slight pull downward; or the compression may be set to maintain the lid wherever set.

In view of this invention and disclosure modifications and variations to meet individual whim or particular need will doubtless become evident to others skilled in the art, and all such are claimed in so far as they fall within the reasonable spirit and scope of this invention.

Having thus described the invention, what is claimed as new and desired to be secured by Letters Patent is:—

1. In a friction support for a lid, a rotatable disc eccentric to the lid pivot, a supporting casing plate upon one side thereof and a follower plate upon the other, a non-metallic washer between the disc and each plate, a spring base supported from the casing plate beyond the follower, a spring thereon and pressed thereby against the follower, and mechanism whereby closing the lid rotates the disc.

2. In a friction support for a lid, a rotatable disc eccentric to the lid pivot, a supporting casing plate upon one side thereof and a follower upon the other, a non-metallic washer between the disc and each plate, a spring base supported from the casing plate beyond the follower, a conical helical spring thereon and pressed thereby against the follower, and mechanism whereby closing the lid rotates the disc.

3. In a friction support for a lid, a rotatable disc eccentric to the lid pivot, a supporting casing plate upon one side thereof and a follower plate upon the other, a non-metallic washer between the disc and each plate, a spring base supported from the casing plate beyond the follower, a conical helical spring thereon flaring toward the follower and pressed by its base against the follower, and mechanism whereby closing the lid rotates the disc.

4. In a friction support for a lid, a casing plate, supported by the cabinet, a rotatable disc having a hub through the casing plate, a crank arm mounted upon the hub to rotate the disc, a connecting link pivotally connected to the outer end of the crank arm and pivotally connected to the lid, a non-rotatable follower plate spaced from the casing plate beyond the disc, means for resiliently pressing the follower plate toward the disc to clutch the disc frictionally and an adjustment for the pressure between the follower plate and casing plate.

5. In a friction support for a lid, a rotatable disc, a supporting casing plate upon one side thereof and a non-rotatable follower plate upon the other, a spring base supported from the casing plate beyond the follower, a spring thereon pressed by the base against the follower to brake the disc, mechanism whereby closing the lid rotates the disc and an adjustment for the compression of the spring.

6. In a friction support for a lid, a rotatable disc, a supporting casing plate upon one side thereof and a non-rotatable follower plate upon the other, a spring base, screws adjustably supporting it from the casing plate beyond the follower, a conical helical spring mounted on the base, flaring toward the follower and bearing against it to brake the disc and mechanism whereby closing the lid rotates the disc.

7. In a friction support for a lid, a rotatable disc, a supporting casing plate upon one side thereof and a follower plate upon the other, a spring base supported from the casing plate beyond the follower, spacing and supporting screws for the base threading into it, a conical helical spring on the base flaring toward the follower plate and pressed thereagainst by the base to brake the disc, and mechanism whereby closing the lid rotates the disc.

8. In a friction support for a lid of a cabinet, a square open box casing mounted bottom outward against a wall of the cabinet, screws in diagonally opposite corners of the box entering the wall, a friction disc within the box having a hub through the bottom, operating mechanism between the lid and hub outside the box, a spring base within the box beyond the disc, other screws in diagonally opposite other corners of the box adjustably supporting the base from the bottom of the box, a non-rotatable follower plate between the disc and base, and a helical spring on the base pressing the follower plate to resiliently brake the disc.

9. In a friction support for a cabinet lid, a box casing mounted bottom outward against a wall of the cabinet, screws from the box entering the wall, a friction disc within the box having a hub through the bottom, operating mechanism outside the box between the lid and hub, a spring base within the box beyond the disc, other screws adjustably supporting the base from the bottom of the box, a non-rotatable follower plate between the disc and base, a nonmetallic washer between the disc and follower plate, and a spring on the base pressing the follower to resiliently brake the disc.

MANIE E. BURTON,
*Executrix of the Estate of Isaac F. Burton, Deceased.*